US012573320B2

(12) United States Patent
Kim et al.

(10) Patent No.: US 12,573,320 B2
(45) Date of Patent: Mar. 10, 2026

(54) DISPLAY DEVICES IN WHICH A FLAT PORTION AND A SLIDING PORTION HAVE DIFFERENT LAMINATED STRUCTURES

(71) Applicant: Samsung Display Co., LTD., Yongin-si (KR)

(72) Inventors: Donghyeon Kim, Yongin-si (KR); In Soo Park, Yongin-si (KR); Ju Yeop Seong, Yongin-si (KR); Seung Wa Ha, Yongin-si (KR); Hyeonji Kim, Yongin-si (KR); Jae-Soo Jang, Yongin-si (KR); Jaewon Jeong, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 155 days.

(21) Appl. No.: 18/519,397

(22) Filed: Nov. 27, 2023

(65) Prior Publication Data

US 2024/0304118 A1 Sep. 12, 2024

(30) Foreign Application Priority Data

Mar. 9, 2023 (KR) ........................ 10-2023-0031324

(51) Int. Cl.

| | |
|---|---|
| ***G06F 1/16*** | (2006.01) |
| ***G09F 9/00*** | (2006.01) |
| ***G09F 9/30*** | (2006.01) |

(52) U.S. Cl.

CPC .................................... *G09F 9/301* (2013.01)

(58) Field of Classification Search

CPC .. G09F 9/301; B32B 3/30; B32B 7/12; B32B 2309/105; B32B 2457/20

See application file for complete search history.

(56) References Cited

U.S. PATENT DOCUMENTS

| | | | | |
|---|---|---|---|---|
| 10,198,041 | B2 * | 2/2019 | Myeong | G02F 1/133305 |
| 10,383,239 | B2 * | 8/2019 | Lee | G06F 1/1652 |
| 10,674,617 | B2 * | 6/2020 | Lin | B32B 7/14 |
| 10,863,619 | B2 * | 12/2020 | Lee | H05K 1/0271 |
| 10,930,883 | B2 * | 2/2021 | Park | H05K 5/0017 |
| 11,221,648 | B2 * | 1/2022 | Myeong | H10K 77/111 |
| 11,284,547 | B2 * | 3/2022 | Shin | G06F 1/16 |
| 11,523,524 | B2 * | 12/2022 | Myung | H10K 59/80 |
| 11,619,975 | B2 * | 4/2023 | Cai | G06F 1/1652 361/679.01 |

(Continued)

FOREIGN PATENT DOCUMENTS

| | | | | |
|---|---|---|---|---|
| CN | 118284921 A * | 7/2024 | | G09F 9/301 |
| KR | 10-2218649 | 2/2021 | | |

(Continued)

*Primary Examiner* — Rockshana D Chowdhury

(74) *Attorney, Agent, or Firm* — Lerner David LLP

(57) ABSTRACT

A display device according to an embodiment includes a flat area and a sliding area, a display panel disposed in the flat area and the sliding area, a first adhesive layer disposed on the display panel in the flat area, a cover member that is disposed on the display panel in the sliding area, a first plate disposed on the cover member, and a second plate disposed on the first adhesive layer. The first adhesive layer and the cover member are spaced apart from each other, and a region between the first adhesive layer and the cover member is covered by the first plate.

19 Claims, 10 Drawing Sheets

(56) References Cited

U.S. PATENT DOCUMENTS

| | | | | | |
|---|---|---|---|---|---|
| 11,793,061 | B2 * | 10/2023 | Cai | B32B 3/14 | 361/807 |
| 12,087,187 | B2 * | 9/2024 | Afsar | G09F 9/301 | |
| 12,111,700 | B2 * | 10/2024 | Kim | G06F 1/1652 | |
| 12,167,632 | B2 * | 12/2024 | Cha | H10K 77/111 | |
| 12,238,910 | B2 * | 2/2025 | You | G09F 9/35 | |
| 2018/0053817 | A1 * | 2/2018 | Kishimoto | H10K 77/111 | |
| 2018/0190936 | A1 * | 7/2018 | Lee | B32B 15/04 | |
| 2018/0192527 | A1 * | 7/2018 | Yun | G06F 1/1681 | |
| 2019/0373719 | A1 * | 12/2019 | Lee | H10K 59/40 | |
| 2020/0051881 | A1 * | 2/2020 | Park | B32B 27/06 | |
| 2021/0004056 | A1 * | 1/2021 | Kim | G09F 9/301 | |
| 2022/0255023 | A1 * | 8/2022 | Cai | B32B 3/14 | |
| 2022/0293016 | A1 * | 9/2022 | Yang | H10K 77/111 | |
| 2022/0308624 | A1 * | 9/2022 | Gu | G06F 1/1656 | |
| 2023/0018953 | A1 * | 1/2023 | Choi | H10K 77/111 | |
| 2023/0029166 | A1 * | 1/2023 | Park | G06F 1/1652 | |
| 2023/0203346 | A1 * | 6/2023 | Youn | B32B 27/365 | 257/40 |
| 2023/0209754 | A1 * | 6/2023 | Lee | B32B 7/12 | 361/714 |
| 2024/0029591 | A1 * | 1/2024 | Qin | H10K 77/111 | |

FOREIGN PATENT DOCUMENTS

| | | |
|---|---|---|
| KR | 10-2322697 | 11/2021 |
| KR | 10-2022-0013766 | 2/2022 |
| KR | 10-2364635 | 2/2022 |
| KR | 10-2022-0115715 | 8/2022 |

* cited by examiner

DISPLAY DEVICES IN WHICH A FLAT PORTION AND A SLIDING PORTION HAVE DIFFERENT LAMINATED STRUCTURES

CROSS-REFERENCE TO RELATED APPLICATION(S)

This application claims priority to and the benefit of Korean Patent Application No. 10-2023-0031324 under 35 U.S.C. § 119, filed on Mar. 9, 2023, in the Korean Intellectual Property Office (KIPO), the entire contents of which are incorporated herein by reference.

BACKGROUND

1. Technical Field

The disclosure relates to a display device in which a sliding portion and a flat portion have different laminated structures.

2. Description of the Related Art

With the recent development of display-related technologies, display devices that can change shape at the stage of use, such as folding, rolling into a roll shape, or stretching like a rubber band, are being researched and developed. Since these displays can be transformed into various forms, they can satisfy both the demand for large display in the use stage and the demand for a down-sized display for portability.

A user may slide and expand the display panel according to the need. A display panel area that is slidable requires low modulus, and the non-slidable display panel area requires high impact resistance, and thus the physical properties required for each area are different.

SUMMARY

Embodiments are to provide a display device with impact resistance and flexibility by implementing different physical properties for each region.

A display device according to an embodiment may include a flat area and a sliding area, a display panel disposed in the flat area and the sliding area, a first adhesive layer disposed on the display panel in the flat area, a cover member disposed on the display panel in the sliding area, a first plate disposed on the cover member, and a second plate disposed on the first adhesive layer. The first adhesive layer and the cover member may be spaced apart from each other, and a region between the first adhesive layer and the cover member may be covered by the first plate.

A thickness of the first adhesive layer may be less than a thickness of the cover member in a thickness direction of the display panel.

A thickness of the first adhesive layer may be in a range of about 10 μm to about 30 μm in a thickness direction of the display panel.

A thickness of the cover member may be in a range of about 50 μm to about 400 μm in a thickness direction of the display panel.

A separation distance between the first adhesive layer and the cover member may be in a range of about 0.2 mm to about 0.5 mm in a thickness direction of the display panel.

The first plate may extend to the flat area and may be disposed in the flat area, and the first plate and the second plate may overlap in the flat area in a thickness direction of the display panel.

The display device may further include a second adhesive layer disposed between the first plate and the second plate that overlap each other in the thickness direction.

A sum of a thickness of the first adhesive layer and a thickness of the second plate may be less than a thickness of the cover member in a thickness direction of the display panel.

The display device may further include a plurality of sliding members disposed on a side of the first plate.

The first plate may include a plurality of grooves.

The display device may further include a cushion layer disposed on a side of the second plate.

The second plate may include a first portion and a second portion having a thickness greater than a thickness of the first portion in a thickness direction of the display panel.

The first plate may overlap the first portion of the second plate in the thickness direction.

The display device may further include a second adhesive layer disposed between the first portion of the second plate and the first plate.

A side surface of the second portion of the second plate may contact a side surface of the first plate.

The display device may further include a third adhesive layer disposed between a side surface of the second portion of the second plate and the first plate.

The display device may further include a second cover member disposed on a side of the display panel and spaced apart from the cover member, and a third plate disposed on a side of the second cover member and spaced apart from the first plate.

The display device may further include a second adhesive layer disposed on a side of the display panel and spaced apart from the cover member, and a third plate disposed on a side of the second adhesive layer and spaced apart from the first plate. The first plate may overlap the third plate in a thickness direction of the display panel.

A rollable display device according to an embodiment may include a flat area and a sliding area, a display panel disposed in the flat area and the sliding area, a first adhesive layer disposed on the display panel in the flat area, a cover member disposed on the display panel in the sliding area, a first plate disposed on the cover member, and a second plate disposed on the first adhesive layer. The first adhesive layer and the cover member may be spaced apart from each other, a region between the first adhesive layer and the cover member may be covered by the first plate, and the cover member may include a polymer.

The rollable display device may further include a cushion layer disposed on a side of the second plate.

According to embodiments, a display device having both impact resistance and flexibility may be provided by implementing different physical properties for each region.

DETAILED DESCRIPTION OF THE EMBODIMENTS

Figure 1:
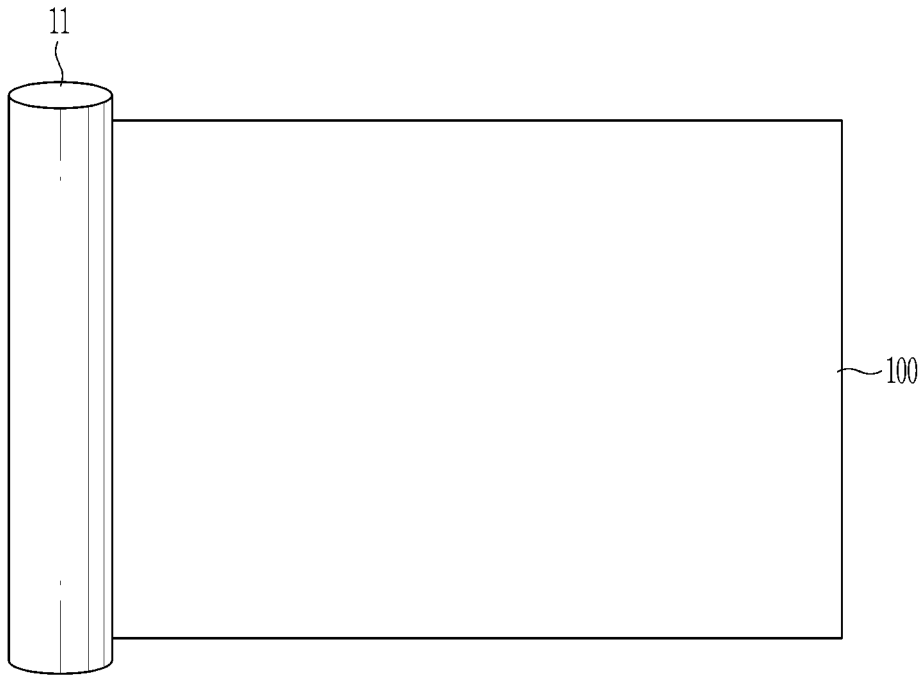
FIG. 1 is a schematic perspective view of a display device according to an embodiment.

Hereinafter, with reference to accompanying drawings, various embodiments of the disclosure will be described in detail and thus a person of an ordinary skill can easily practice them in the technical field to which the disclosure belongs. The disclosure may be embodied in many different forms and is not limited to the embodiments described herein.

In order to clearly explain the disclosure, parts irrelevant to the description are omitted, and the same reference numerals are applied to the same or similar constituent elements throughout the specification.

In addition, since the size and thickness of each component shown in the drawing is arbitrarily shown for convenience of explanation, the disclosure is not necessarily limited to the drawings. In the drawings, the thickness of layers, films, panels, regions, etc., are exaggerated for clarity. In addition, in the drawing, the thickness of some layers and regions is exaggerated for convenience of explanation.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Further, throughout the specification, the phrase "on a plane" or "in a plan view" means viewing a target portion from the top, and the phrase "on a cross-section" or "in a cross-sectional view" means viewing a cross-section formed by vertically cutting a target portion from the side.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, a display device according to an embodiment will be described in detail with reference to the accompanying drawings.

FIG. 1 is a schematic perspective view of a display device according to an embodiment. Referring to FIG. 1, a display device according to an embodiment may be a rollable display device. Referring to FIG. 1, a display device according to an embodiment may include a roller 11 and a display panel 100 wound as a roll in the roller 11. Although it is not illustrated, a rod (not shown) may be disposed within the roller 11, and the display panel 100 may be wound around the rod as a central axis. For example, a user may unwind and expand the display panel 100 wound around the roller 11 to use the display panel as needed according to the embodiment. The display panel may include a sliding member (not shown) at the bottom, and a rolling motion may occur while the sliding member (not shown) slides.

Figure 2:
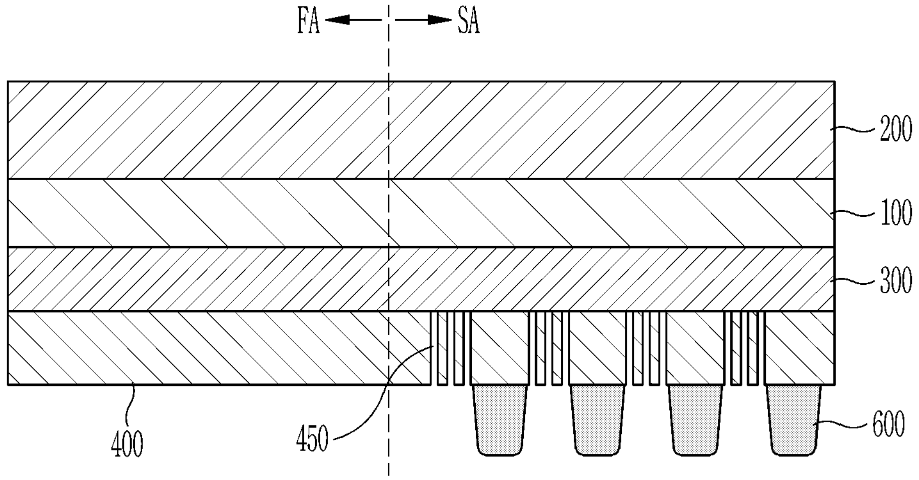
FIG. 2 is a schematic cross-sectional view of a display device of FIG. 1.

FIG. 2 is a schematic cross-sectional view of a display device of FIG. 1. Referring to FIG. 2, the display device may include a display panel 100, a cover window 200 disposed on a side of the display panel 100, a cover member 300 disposed on another side of the display panel 100, and a plate 400 disposed on a bottoms side of the cover member 300. The plate 400 may include multiple grooves 450, and a sliding member 600 may be disposed on a surface of the plate 400. The display device of FIG. 2 may be divided into a flat area FA and a sliding area SA. The flat area FA may be a portion that does not slide, and the sliding area SA may be a portion that slides. The flat area FA may not include the sliding member 600, and the sliding area SA may include the sliding member 600.

Figure 3:
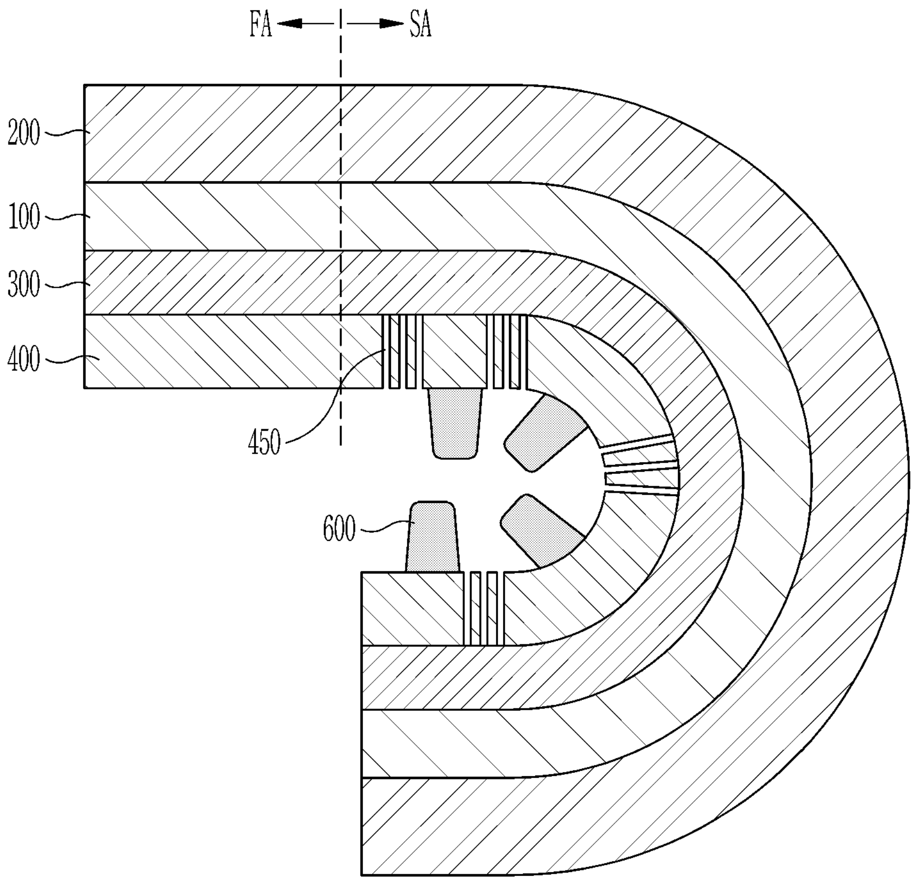
FIG. 3 is a schematic cross-sectional view of a display device in a rolled state.

FIG. 3 is a schematic cross-sectional view of a display device in a rolled state. As shown in FIG. 3, the rolling motion may be performed while the sliding member 600 slides. In FIG. 3, the flat area FA and the sliding area SA are separately illustrated. The flat area FA and the sliding area SA may require different physical properties. For example, since the flat area FA is a non-rolling portion, a low modulus may not be required. Since the flat area FA is an exposed portion that is not rolled, high impact resistance may be required. However, the sliding area SA may be a part where the display device rolls, and a low modulus may be required. In case that the modulus is high, cracks may occur or the laminated structure may peel off during the rolling process. Since the sliding area SA is not exposed as a part that is normally rolled, the impact resistance of the sliding area SA may be lower than the impact resistance of the flat area FA. The display device may need different physical properties for the flat area FA and the sliding area SA. Accordingly, the display device may include a laminated structure of the flat area FA and the sliding area SA that have different properties according to the present embodiment.

Figure 4:
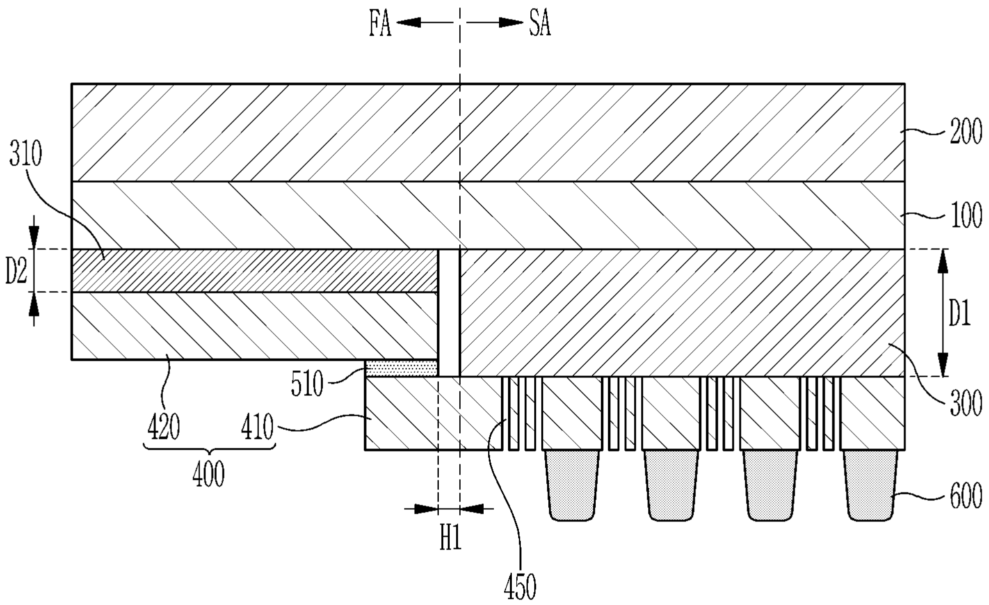
FIG. 4 is a schematic cross-sectional view of a display device according to an embodiment.

FIG. 4 is a schematic cross-sectional view of a display device according to an embodiment. Referring to FIG. 4, a display device according to an embodiment may be a rollable display device, and may include a flat area FA and a sliding area SA. Description of the flat area FA and the sliding area SA is the same as described above. For example, the sliding area SA may be a portion that slides and thus a display panel may be bent, and the flat area FA may be a portion that does not slide and the display panel may not be bent.

Referring to FIG. 4, a display panel 100 may be disposed. The display panel 100 may include multiple transistors and a light-emitting element connected to the transistors. A cover window 200 may be disposed on a side of the display panel 100.

The display device may include a flat area FA and a sliding area SA. A cover member 300 may be disposed on a side of the display panel 100 in the sliding area SA. The cover member 300 may include an organic material. The cover member 300 may include a polymer material, for example, polyurethane or polyimide.

In the flat area FA, a first adhesive layer 310 may be disposed on a side of the display panel 100. For example, the first adhesive layer 310 may be disposed in the flat area FA, and the cover member 300 may be disposed in the sliding area SA. A thickness of the cover member 300 may be greater than a thickness of the first adhesive layer 310 in a thickness direction of the display panel 100. For example, a thickness D1 of the cover member 300 may be in a range of about 50 μm to about 400 μm. A thickness D2 of the first adhesive layer 310 may be in a range of about 10 μm to about 30 μm.

For example, the display device according to an embodiment may have a low modulus and high flexibility in the sliding area SA as the cover member 300 including a polymer is disposed in the sliding area SA. Since the flat area FA does not include the cover member 300, the overall thickness may be reduced.

Referring to FIG. 4, the cover member 300 and the first adhesive layer 310 may be spaced apart from each other, and a separation distance H1 between the cover member 300 and the first adhesive layer 310 may be in a range of about 0.2 mm to about 0.5 mm. In case that the separation distance H1 is less than 0.2 mm, it may be difficult to manage the tolerance in the manufacturing process and sufficient grooves may not be formed. In case that the separation distance H1 is greater than 0.5 mm, a separation region may be visible from the outside.

Referring to FIG. 4, a plate 400 may be disposed at the bottom of the cover member. The plate 400 may include a first plate 410 and a second plate 420 separated from each other. The first plate 410 may be disposed below the cover member 300. The second plate 420 may be disposed below the first adhesive layer 310 and may be attached to the display panel 100 through the first adhesive layer 310. For example, the first plate 410 may be disposed in the sliding area SA, and the second plate 420 may be disposed in the flat area FA. As shown in FIG. 4, the first plate 410 may extend to the flat area FA and may overlap the second plate 420 in a thickness direction of the display panel 100. A third adhesive layer 510 may be disposed in an overlapping area of the first plate 410 and the second plate 420, and thus the first plate 410 and the second plate 420 may be bonded to each other.

As shown in FIG. 4, a separation region between the cover member 300 and the first adhesive layer 310 may be covered by the first plate 410.

Therefore, the separated region may not be visible from the outside. In FIG. 4, the sum of the thickness of the second plate 420 and the thickness of the first adhesive layer 310 may be equal to or less than the thickness of the cover member 300. In case that the thicknesses are within the condition, the second plate 420 and the first plate 410 may be stably bonded.

Multiple sliding members 600 may be disposed on the second plate 420. Multiple grooves 450 may be formed in a region of the first plate 410 between the sliding members 600. Since the grooves 450 are formed on the second plate 420, the second plate 420 may be readily bent. As described above, the sliding area SA including the first plate 410 may be bent as the sliding member 600 slides.

In an embodiment, the first plate 410 and the second plate 420 may include a metal or a carbon fiber reinforced plastic (CFRP). The first plate 410 and the second plate 420 may include a titanium alloy, stainless steel, carbon fiber reinforced plastic, or a combination thereof. The first plate 410 and the second plate 420 may include different materials or a same material. For example, one of the first plate 410 and the second plate 420 may include a metal and another one of the first plate 410 and the second plate 420 may include a plastic. The thicknesses of the first plate 410 and the second plate 420 may be the same or different from each other.

Figure 5:
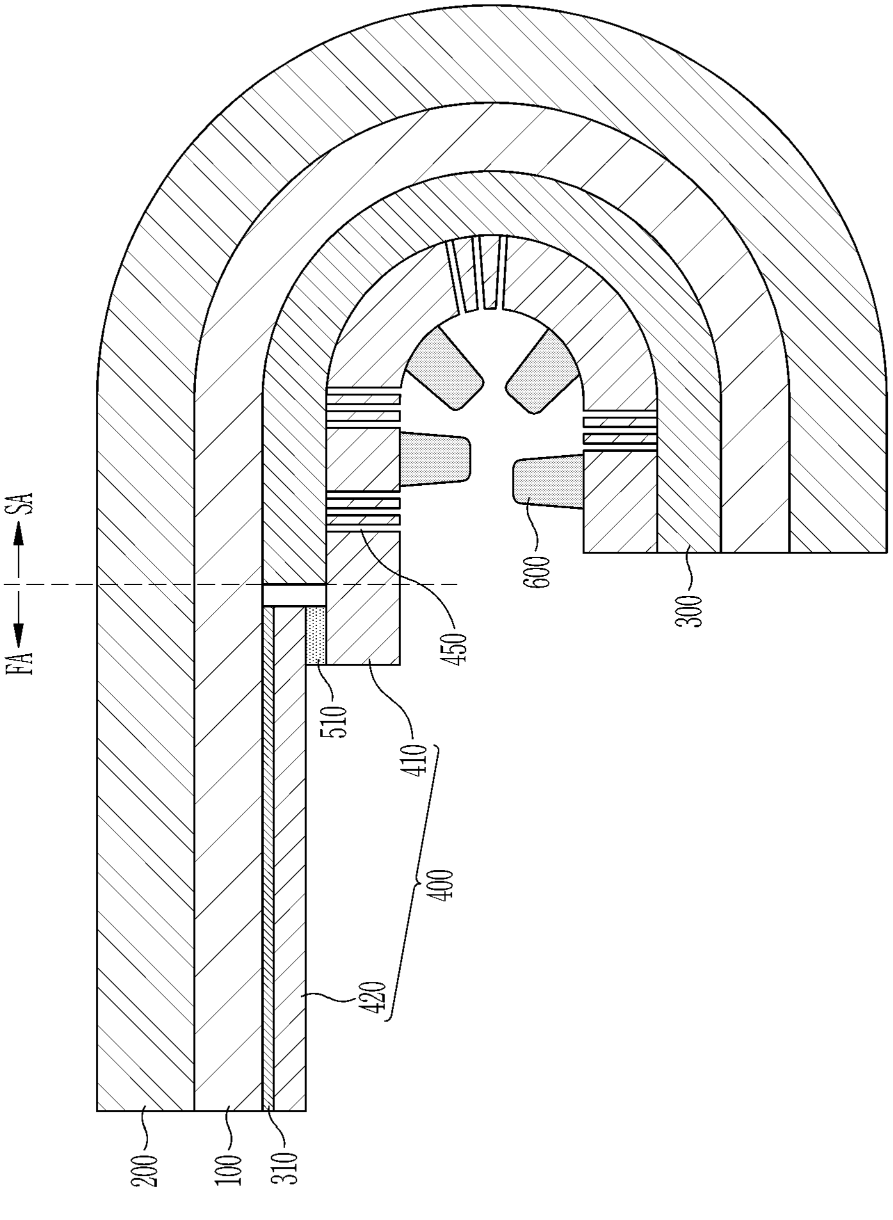
FIG. 5 is a schematic cross-sectional view of a display device of FIG. 4 in a bent state according to an embodiment.

FIG. 5 is a schematic cross-sectional view of a display device of FIG. 4 in a bent state according to an embodiment. Referring to FIG. 5, in the display device according to an embodiment, the sliding area SA may be bent. As described above, the bended sliding area SA may require high flexibility and a low modulus, and as shown in FIG. 4 and FIG. 5, the cover member 300 may be disposed in the sliding area SA and therefore the sliding area SA may have a low modulus and high flexibility. As shown in FIG. 5, the separated region between the first plate 410 and the second plate 420 may be covered by the first plate 410, and thus the separated region may not be visible from the outside.

Figure 6:
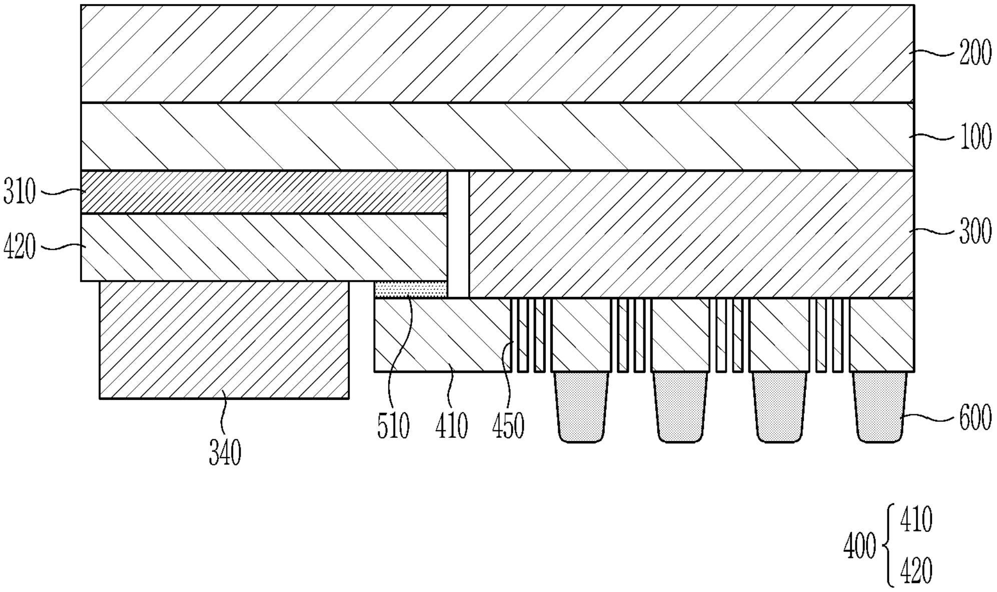
FIG. 6 is a schematic cross-sectional view of a display device according to another embodiment.

FIG. 6 is a schematic cross-sectional view of a display device according to another embodiment. The embodiment of FIG. 6 and the embodiment of FIG. 4 may be different at least in that the display device may include a cushion layer 340 below a second plate 420. A detailed description of the same constituent elements is omitted. Referring to FIG. 6, a display device according to an embodiment may further include a cushion layer 340 disposed below the second plate 420 in a flat area FA. In case that a cushion layer 340 is disposed below the second plate 420, an impact resistance of the display device may be further improved.

Figure 7:
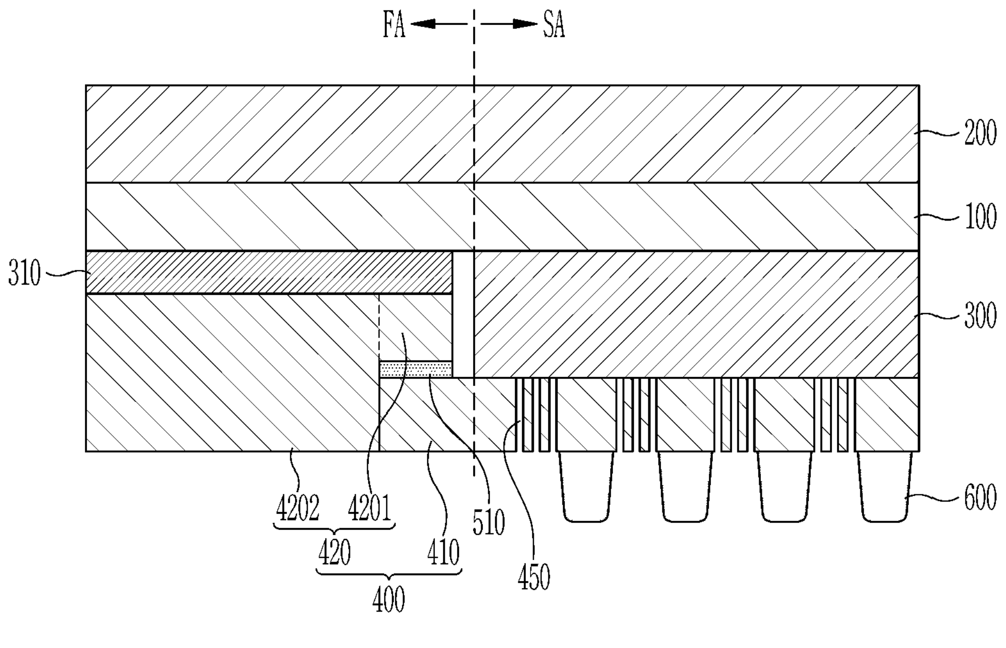
FIG. 7 is a schematic cross-sectional view of a display device according to another embodiment.

FIG. 7 is a schematic cross-sectional view of a display device according to another embodiment. The embodiment of FIG. 7 and the embodiment of FIG. 4 may be different at least in a shape of s second plate 420. A detailed description of the same constituent elements is omitted. Referring to FIG. 7, a second plate 420 of a display device according to an embodiment may include a first portion 4201 and a second portion 4202 having different thicknesses. The first portion 4201 may be a portion overlapping the first plate 410 in a thickness direction of the display panel 100, and a thickness of the first portion 4201 may be less than a thickness of the second portion 4202 in the thickness direction. The thickness of the second portion 4202 may be greater than the thickness of the first portion 4201, and due to this, as shown in FIG. 7, a thickness of sliding area SA and a thickness of flat area FA may be similar. In case that the thickness of the second plate 420 disposed in the flat area FA increases, the impact resistance of the display device may be improved. A third adhesive layer 510 may be disposed between the first portion 4201 of the second plate 420 and the first plate 410. However, as shown in FIG. 7, an adhesive layer may not be disposed between a side surface of the second portion 4202 of the second plate 420 and the first plate 410. For example, a side surface of the second portion 4202 of the second plate 420 and the first plate 410 may be in direct contact.

Figure 8:
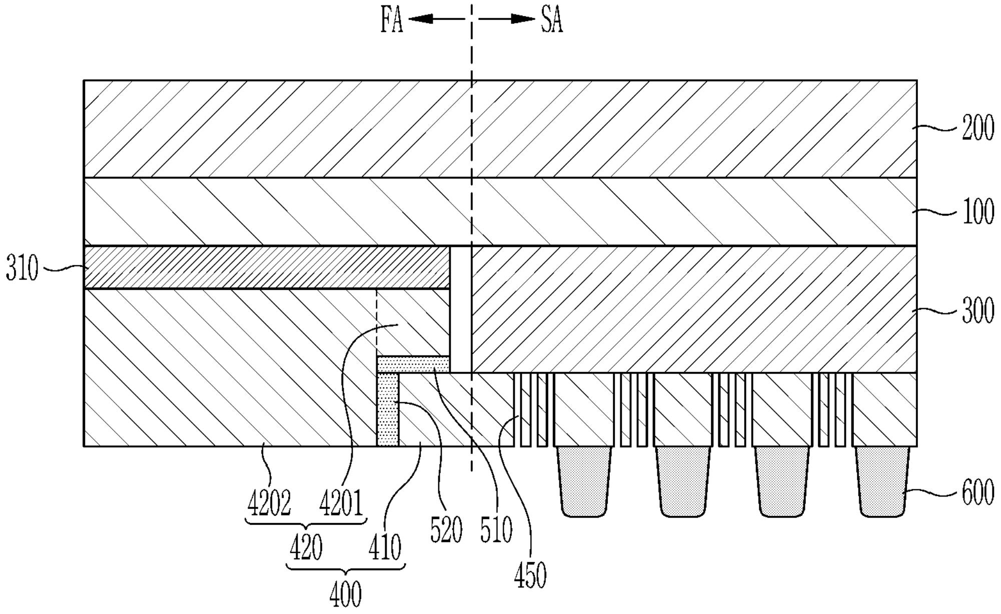
FIG. 8 is a schematic cross-sectional view of a display device according to another embodiment.

However, the disclosure is not limited thereto, and in another embodiment, a fourth adhesive layer 520 may be disposed between the side surface of the second portion 4202 of the second plate 420 and the first plate 410. FIG. 8 is a schematic cross-sectional view of a display device according to another embodiment. The embodiment of FIG. 8 and the embodiment of FIG. 7 may be different at least in that a fourth adhesive layer 520 may be disposed between a side surface of a second portion 4202 of a second plate 420 and a first plate 410. A detailed description of the same constituent elements is omitted.

In an embodiment, the plate 400 may include the first plate 410 and the second plate 420 that are separated from each other, but in another embodiment, the display device may further include a third plate 430. The third plate 430 may be spaced apart from other plates.

Figure 9:
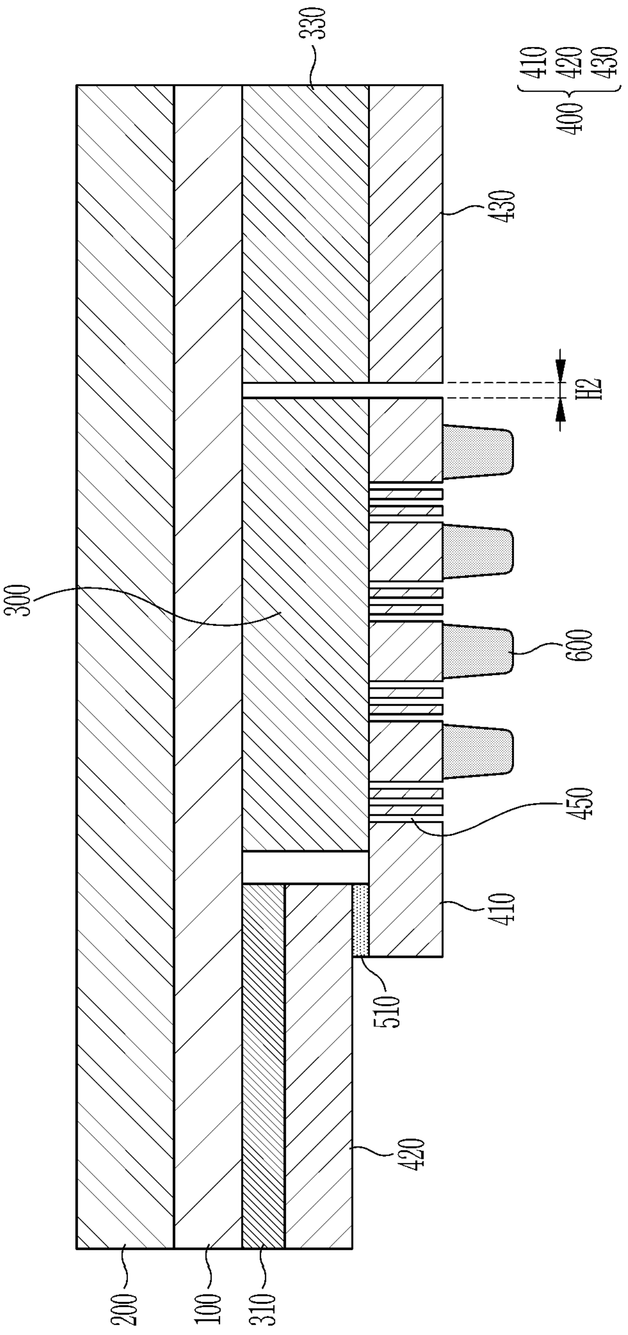
FIG. 9 is a schematic cross-sectional view of a display device according to another embodiment.

FIG. 9 is a schematic cross-sectional view of a display device according to another embodiment. The embodiment of FIG. 9 and the embodiment of FIG. 4 may be different at least in that the display device may include a third plate 430. As shown in FIG. 9, the third plate 430 may be disposed apart from a first plate 410. A second cover member 330 may be disposed between the third plate 430 and the display panel 100, and the second cover member 330 may be disposed apart from the cover member 300. A separation distance H2 between the third plate 430 and the cover member 300 may be in a range of about 0.2 mm to about 0.5 mm. In case that the separation distance H2 is less than 0.2 mm, it may be difficult to manage the tolerance in the manufacturing process and a groove may not be formed. In case that the separation distance H1 is greater than 0.5 mm, a separation region may be visible from the outside.

In an embodiment, a thickness of the second cover member 330 and a thickness of the cover member 300 may be similar, and a thickness of the third plate 430 and a thickness of the first plate 410 may be similar.

Figure 10:
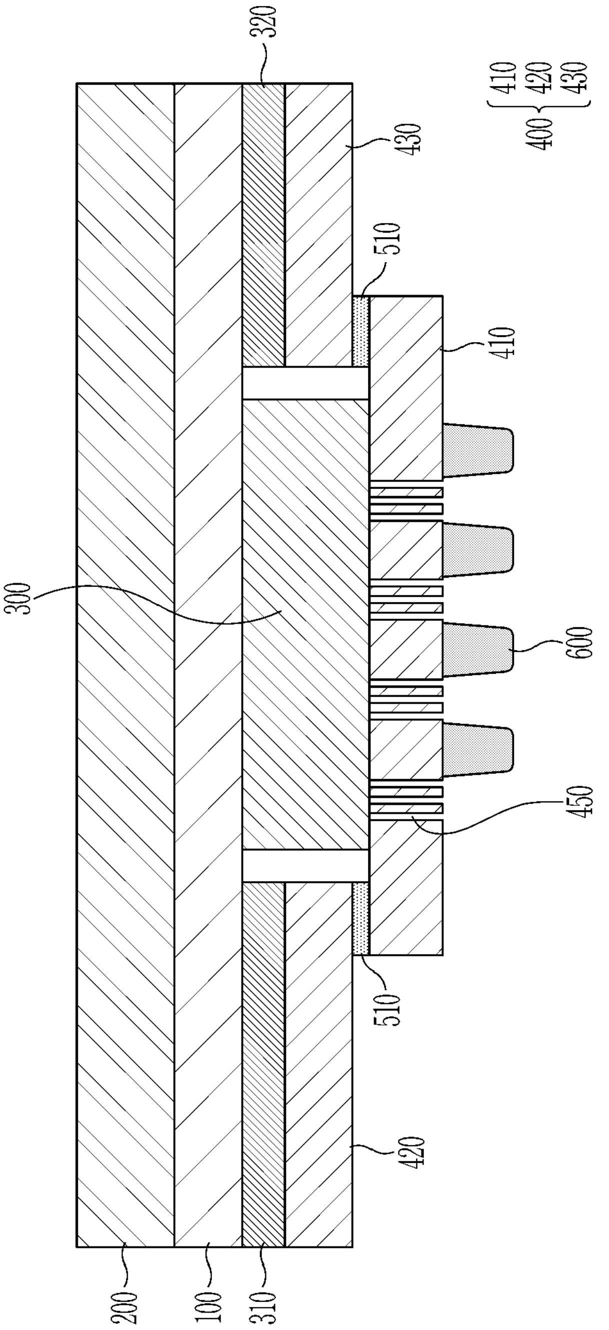
FIG. 10 is a schematic cross-sectional view of a display device according to another embodiment.

FIG. 10 is a schematic cross-sectional view of a display device according to another embodiment. The embodiment of FIG. 10 and the embodiment of FIG. 9 may be different at least in that the display device may include a second adhesive layer 320 instead of a second cover member 330. A detailed description of the same constituent element is omitted. Referring to FIG. 10, a third plate 320 may be disposed on the second adhesive layer 320. A third adhesive layer 510 may be disposed between the first plate 410 and the third plate 430, and the first plate 410 and the third plate 430 may be bonded to each other. For example, the embodiment of FIG. 10 may have a symmetrical structure based on the first plate 410.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:
a flat area and a sliding area
a display panel disposed in the flat area and the sliding area;
a first adhesive layer disposed on the display panel in the flat area;
a cover member disposed on the display panel in the sliding area;
a first plate disposed on the cover member; and
a second plate disposed on the first adhesive layer, wherein
the first adhesive layer and the cover member are spaced apart from each other,
a region between the first adhesive layer and the cover member is covered by the first plate,
the first plate extends to the flat area and is disposed in the flat area, and
the first plate and the second plate overlap in the flat area in a thickness direction of the display panel.

2. The display device of claim 1, wherein a thickness of the first adhesive layer is less than a thickness of the cover member in a thickness direction of the display panel.

3. The display device of claim 1, wherein a thickness of the first adhesive layer is in a range of about 10 μm to about 30 μm in a thickness direction of the display panel.

4. The display device of claim 1, wherein a thickness of the cover member is in a range of about 50 μm to about 400 μm in a thickness direction of the display panel.

5. The display device of claim 1, wherein a separation distance between the first adhesive layer and the cover member is in a range of about 0.2 mm to about 0.5 mm in a thickness direction of the display panel.

6. The display device of claim 1, further comprising:
a second adhesive layer disposed between the first plate and the second plate that overlap each other in the thickness direction.

7. The display device of claim 1, wherein a sum of a thickness of the first adhesive layer and a thickness of the second plate is less than a thickness of the cover member in a thickness direction of the display panel.

8. The display device of claim 1, further comprising:
a plurality of sliding members disposed on a side of the first plate.

9. The display device of claim 1, wherein the first plate comprises a plurality of grooves.

10. The display device of claim 1, further comprising:
a cushion layer disposed on a side of the second plate.

11. The display device of claim 1, wherein the second plate comprises a first portion and a second portion having a thickness greater than a thickness of the first portion in a thickness direction of the display panel.

12. The display device of claim 11, wherein the first plate overlaps the first portion of the second plate in the thickness direction.

13. The display device of claim 12, further comprising:
a second adhesive layer disposed between the first portion of the second plate and the first plate.

14. The display device of claim 12, wherein a side surface of the second portion of the second plate contacts a side surface of the first plate.

15. The display device of claim 12, further comprising:
a third adhesive layer disposed between a side surface of the second portion of the second plate and the first plate.

16. The display device of claim 1, further comprising:
a second cover member disposed on a side of the display panel and spaced apart from the cover member; and
a third plate disposed on a side of the second cover member and spaced apart from the first plate.

17. The display device of claim 1, further comprising:
a second adhesive layer disposed on a side of the display panel and spaced apart from the cover member; and a third plate disposed on a side of the second adhesive layer and spaced apart from the first plate, wherein the first plate overlaps the third plate in a thickness direction of the display panel.

18. A rollable display device comprising:

a flat area and a sliding area a display panel disposed in the flat area and the sliding area;

a first adhesive layer disposed on the display panel in the flat area;

a cover member disposed on the display panel in the sliding area;

a first plate disposed on the cover member; and a second plate disposed on the first adhesive layer, wherein the first adhesive layer and the cover member are spaced apart from each other, a region between the first adhesive layer and the cover member is covered by the first plate, the cover member includes a polymer, and the first plate extends to the flat area and is disposed in the flat area, and the first plate and the second plate overlap in the flat area in a thickness direction of the display panel.

19. The rollable display device of claim 18, further comprising:

a cushion layer disposed on a side of the second plate.

* * * * *